(12) United States Patent
Yan

(10) Patent No.: US 7,434,387 B2
(45) Date of Patent: Oct. 14, 2008

(54) INTEGRATED DPF-REFORMER

(75) Inventor: Jiyang Yan, Troy, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/493,119

(22) Filed: Jul. 26, 2006

(65) Prior Publication Data

US 2008/0022661 A1 Jan. 31, 2008

(51) Int. Cl.
*F01N 3/00* (2006.01)

(52) U.S. Cl. .............................. 60/286; 60/274; 60/295; 60/297; 60/301; 60/311

(58) Field of Classification Search .................... 60/274, 60/286, 295, 297, 301, 303, 311
See application file for complete search history.

(56) References Cited

U.S. PATENT DOCUMENTS

| | | | | |
|---|---|---|---|---|
| 4,887,427 | A * | 12/1989 | Shinzawa et al. | ............. 60/286 |
| 5,067,320 | A * | 11/1991 | Kanesaki | ..................... 60/297 |
| 5,330,945 | A | 7/1994 | Beckmeyer et al. | |
| 5,707,593 | A | 1/1998 | Wang | |
| 6,732,507 | B1 | 5/2004 | Stanglmaier et al. | |
| 6,735,941 | B2 | 5/2004 | Saito et al. | |
| 6,745,560 | B2 * | 6/2004 | Stroia et al. | ................... 60/286 |
| 6,758,036 | B1 | 7/2004 | Molinier | |
| 2001/0052232 | A1 | 12/2001 | Hoffmann et al. | |
| 2003/0113249 | A1 | 6/2003 | Hepburn et al. | |
| 2003/0140622 | A1 | 7/2003 | Taylor, III et al. | |
| 2004/0050037 | A1 | 3/2004 | Betta et al. | |
| 2004/0076565 | A1 | 4/2004 | Gandhi et al. | |
| 2004/0116276 | A1 | 6/2004 | Yezerets et al. | |
| 2007/0012032 | A1 * | 1/2007 | Hu | ............................. 60/286 |

FOREIGN PATENT DOCUMENTS

| | | | |
|---|---|---|---|
| JP | 59150918 | * | 8/1984 |
| JP | 06294316 | * | 10/1994 |
| JP | 2001355431 | * | 12/2001 |
| WO | WO 1998/029180 A1 | | 7/1998 |
| WO | WO 2003/011437 A1 | | 2/2003 |
| WO | WO 2003/056150 A2 | | 7/2003 |
| WO | WO 2004/061278 A1 | | 7/2004 |
| WO | WO 2004/090296 A1 | | 10/2004 |

* cited by examiner

*Primary Examiner*—Thomas Denion
*Assistant Examiner*—Diem Tran
(74) *Attorney, Agent, or Firm*—Paul V. Keller

(57) ABSTRACT

A method of operating a power generation system involves operating a diesel engine to produce exhaust that is passed first through a combined DPF-fuel reformer and then a LNT. In response to the control signal to regenerate the LNT, fuel is injected into the exhaust at a rate that leaves the exhaust lean, whereby the injected fuel combusts in the combined DPF-reformer, warming it. There follows a rich phase in which fuel is injected into the exhaust at a rate that leaves the exhaust rich, whereby the DPF-reformer produces reformate and the LNT is regenerated. The combined DPF-reformer undergoes a regeneration that removes accumulated particulate matter with each LNT regeneration. Preferably, the DPF-reformer has a low thermal mass to facilitate heating. Preferably, the DPF-reformer includes a soot gasification catalyst, whereby a substantial amount of particulate matter is removed from the DPF-reformer during the rich phases.

20 Claims, 2 Drawing Sheets

INTEGRATED DPF-REFORMER

FIELD OF THE INVENTION

The present invention relates to pollution control devices for diesel engines.

BACKGROUND $NO_x$ and particulate matter (soot) emissions from diesel engines are an environmental problem. Several countries, including the United States, have long had regulations pending that will limit $NO_x$ and particulate matter emissions from trucks and other diesel-powered vehicles. Manufacturers and researchers have put considerable effort toward meeting those regulations. Diesel particulate filters (DPFs) have been proposed for controlling particulate matter emissions. A number of different solutions have been proposed for controlling NOx emissions.

In gasoline powered vehicles that use stoichiometric fuel-air mixtures, $NO_x$ emissions can be controlled using three-way catalysts. In diesel-powered vehicles, which use compression ignition, the exhaust is generally too oxygen-rich for three-way catalysts to be effective.

One set of approaches for controlling NOx emissions from diesel-powered vehicles involves limiting the creation of pollutants. Techniques such as exhaust gas recirculation and partially homogenizing fuel-air mixtures are helpful in reducing NOx emissions, but these techniques alone are not sufficient. Another set of approaches involves removing NOx from the vehicle exhaust. These approaches include the use of lean-burn $NO_x$ catalysts, selective catalytic reduction (SCR), and lean $NO_x$ traps (LNTs).

Lean-burn NOx catalysts promote the reduction of $NO_x$ under oxygen-rich conditions. Reduction of NOx in an oxidizing atmosphere is difficult. It has proven challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. Lean-burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiencies for lean-burn NOx catalysts are unacceptably low.

SCR generally refers to selective catalytic reduction of NOx by ammonia. The reaction takes place even in an oxidizing environment. The NOx can be temporarily stored in an adsorbent or ammonia can be fed continuously into the exhaust. SCR can achieve high levels of NOx reduction, but there is a disadvantage in the lack of infrastructure for distributing ammonia or a suitable precursor. Another concern relates to the possible release of ammonia into the environment.

To clarify the state of a sometime ambiguous nomenclature, it should be noted that in the exhaust aftertreatment art, the terms "SCR catalyst" and "lean NOx catalyst" are occasionally used interchangeably. Where the term "SCR" is used to refer just to ammonia-SCR, as it often is, SCR is a special case of lean NOx catalysis. Commonly when both types of catalysts are discussed in one reference, SCR is used with reference to ammonia-SCR and lean NOx catalysis is used with reference to SCR with reductants other than ammonia, such as SCR with hydrocarbons.

LNTs are devices that adsorb NOx under lean exhaust conditions and reduce and release the adsorbed NOx under rich exhaust conditions. A LNT generally includes a NOx adsorbent and a catalyst. The adsorbent is typically an alkaline earth compound, such as $BaCO_3$ and the catalyst is typically a combination of precious metals, such as Pt and Rh. In lean exhaust, the catalyst speeds oxidizing reactions that lead to NOx adsorption. In a reducing environment, the catalyst activates reactions by which adsorbed NOx is reduced and desorbed. In a typical operating protocol, a reducing environment will be created within the exhaust from time-to-time to remove accumulated NOx and thereby regenerate (denitrate) the LNT.

Creating a reducing environment for LNT regeneration involves eliminating most of the oxygen from the exhaust and providing a reducing agent. Except where the engine can be run stoichiometric or rich, a portion of the reductant reacts within the exhaust to consume oxygen. The amount of oxygen to be removed by reaction with reductant can be reduced in various ways. If the engine is equipped with an intake air throttle, the throttle can be used. However, at least in the case of a diesel engine, it is generally necessary to eliminate some of the oxygen in the exhaust by combustion or reforming reactions with reductant that is injected into the exhaust.

The reactions between reductant and oxygen can take place in the LNT, but it is generally preferred for the reactions to occur in a catalyst upstream of the LNT, whereby the heat of reaction does not cause large temperature increases within the LNT at every regeneration.

Reductant can be injected into the exhaust by the engine fuel injectors or separate injection devices. For example, the engine can inject extra fuel into the exhaust within one or more cylinders prior to expelling the exhaust. Alternatively, or in addition, reductant can be injected into the exhaust downstream of the engine.

U.S. Pat. Pub. No. 2004/0050037 (hereinafter "the '037 publication") describes an exhaust treatment system with a fuel reformer placed in the exhaust line upstream of a LNT. The reformer includes both oxidation and reforming catalysts. The reformer both removes excess oxygen and converts the diesel fuel reductant into more reactive reformate.

The operation of an inline reformer can be modeled in terms of the following three reactions:

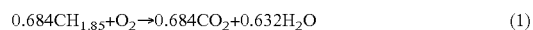

$$0.684CH_{1.85} + O_2 \rightarrow 0.684CO_2 + 0.632H_2O \quad (1)$$

$$0.316CH_{1.85} + 0.316H_2O \rightarrow 0.316CO + 0.608H_2 \quad (2)$$

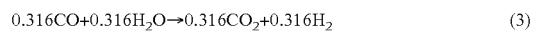

$$0.316CO + 0.316H_2O \rightarrow 0.316CO_2 + 0.316H_2 \quad (3)$$

wherein $CH_{1.85}$ represents an exemplary reductant, such as diesel fuel, with a 1.85 ratio between carbon and hydrogen. Reaction (1) is exothermic complete combustion by which oxygen is consumed. Reaction (2) is endothermic steam reforming. Reaction (3) is the water gas shift reaction, which is comparatively thermal neutral.

The inline reformer of the '037 publication is designed to be rapidly heated and to then catalyze steam reforming. Temperatures from about 500 to about 700° C. are said to be required for effective reformate production by this reformer. These temperatures are substantially higher than typical diesel exhaust temperatures. The reformer is heated by injecting fuel at a rate that leaves the exhaust lean, whereby Reaction (1) takes place. After warm up, the fuel injection rate is increased to provide a rich exhaust. Depending on such factors as the exhaust oxygen concentration, the fuel injection rate, and the exhaust temperature, the reformer tends to either heat or cool as reformate is produced. Reformate is an effective reductant for LNT denitration.

The prior art also describes an inline fuel reformer, that in contrast to the '037 publication fuel reformer, are provided with a large thermal mass and are intended to operate at exhaust gas temperatures. In one example, the fuel reformer is also a DPF. Combining these two devices into one is said to offer the advantage of compact design. The large thermal mass stabilizes the reformer temperature against variations in exhaust gas temperature, whereby the reformer does not cool excessively during periods of low exhaust gas temperature. To regenerate the DPF, the device may be heated electrically or with a fuel burner. As in the case of the '037 publication, reformate is used to regenerate a downstream LNT.

During denitrations, much of the adsorbed NOx adsorbed in LNTs is reduced to $N_2$, although a portion of the adsorbed NOx is released without having been reduced and another portion of the adsorbed NOx is deeply reduced to ammonia. The NOx release occurs primarily at the beginning of the regeneration. The ammonia production has generally been observed towards the end of the regeneration.

U.S. Pat. No. 6,732,507 proposes a system in which a SCR catalyst is configured downstream of the LNT in order to utilize the ammonia released during denitration. The LNT is provided with more reductant over the course of a regeneration than required to remove the accumulated NOx in order to facilitate ammonia production. The ammonia is utilized to reduce NOx slipping past the LNT and thereby improves conversion efficiency over a stand-alone LNT.

U.S. Pat. Pub. No. 2004/0076565 describes hybrid systems combining LNT and SCR catalysts. In order to increase ammonia production, it is proposed to reduce the rhodium loading of the LNT. In order to reduce the NOx release at the beginning of the regeneration, it is proposed to eliminate oxygen storage capacity from the LNT.

In addition to accumulating NOx, LNTs accumulate SOx. SOx is the combustion product of sulfur present in ordinarily fuel. Even with reduced sulfur fuels, the amount of SOx produced by combustion is significant. SOx adsorbs more strongly than NOx and necessitates a more stringent, though less frequent, regeneration. Desulfation requires elevated temperatures as well as a reducing atmosphere. The temperature of the exhaust can be elevated by engine measures, particularly in the case of a lean-burn gasoline engine, however, at least in the case of a diesel engine, it is often necessary to provide additional heat. Typically, this heat can be provided through the same types of reactions as used to remove excess oxygen from the exhaust. Once the LNT is sufficiently heated, the exhaust is made rich by measures like those used for LNT denitration.

Diesel particulate filters must also be regenerated. Regeneration of a DPF is to remove accumulated soot. Two general approaches are continuous and intermittent regeneration. In continuous regeneration, a catalyst is provided upstream of the DPF to convert NO to $NO_2$. $NO_2$ can oxidize soot combustion at typical diesel exhaust temperatures and thereby effectuate continuous regeneration. A disadvantage of this approach is that it requires a large amount of expensive catalyst.

Intermittent regeneration involves heating the DPF to a temperature at which soot combustion is self-sustaining in a lean environment. Typically this is a temperature from about 400 to about 650° C., depending in part on what type of catalyst coating has been applied to the DPF to lower the soot ignition temperature. A challenge in using this approach is that soot combustion tends to be non-uniform and high local temperatures can lead to degradation of the DPF.

Because both DPF regeneration and LNT desulfation require heating, it has been proposed to carry out the two operation successively. The main barrier to combining desulfation and DPF regeneration has been that desulfation requires rich condition and DPF regeneration requires lean conditions. U.S. Pat. Pub. No. 2001/0052232 suggests heating the DPF to initiate soot combustion, and afterwards desulfating the LNT, whereby the LNT does not need to be separately heated. Similarly, U.S. Pat. Pub. No. 2004/0113249 describes adding reductant to the exhaust gases to heat the DPF, ceasing the addition of reductant to allow the DPF to regenerate, and then resuming reductant addition to desulfate the LNT.

U.S. Pat. Pub. No. 2004/0116276 suggests close coupling a DPF and a LNT, with the DPF upstream of the LNT. The publication suggests that this close-coupling allows CO produced in the DPF during DPF regeneration to assist regeneration of the downstream LNT by removing NOx during DPF regeneration in a lean environment.

In spite of advances, there continues to be a long felt need for an affordable and reliable exhaust treatment system that is durable, has a manageable operating cost (including fuel penalty), and is practical for reducing NOx emissions from diesel engines to a satisfactory extent in the sense of meeting U.S. Environmental Protection Agency (EPA) regulations effective in 2010 and other such regulations

SUMMARY

One of the inventor's concepts relates to a method of operating a power generation system. The method involves operating a diesel engine to produce exhaust that is passed first through a combined DPF-fuel reformer and then a LNT. From time-to-time, a control signal is issued to regenerate the LNT. In response to the control signal, fuel is injected into the exhaust upstream of the combined DPF-reformer at a rate that leaves the exhaust lean, whereby the injected fuel combusts in the combined DPF-reformer, warming it. There follows a rich phase in which fuel is injected into the exhaust at a rate that leaves the exhaust rich, whereby the DPF-reformer produces reformate and the LNT is regenerated. According to the method, the combined DPF-reformer undergoes a regeneration that removes accumulated particulate matter with each LNT regeneration.

The method allows the use of a smaller DPF in that the DPF is regenerated more frequently than a conventional DPF. Because less soot accumulates, the risk of over heating and substrate damage due to excessive soot combustion is greatly reduced. Frequent DPF regenerations are also desirable in that soot becomes harder to remove as it ages. Preferably, the DPF-reformer has a low thermal mass to facilitate heating. Preferably, the DPF-reformer includes a soot gasification catalyst, whereby a substantial amount of particulate matter is removed from the DPF-reformer during the rich phases. The heat released by soot combustion can augment reformer heating, and heat taken up by soot gasification can help stabilize reformer operation.

Another of the inventor's concepts relates to power generation system, comprising a diesel engine, an exhaust line configured to receive the exhaust from the engine, a DPF configured with the exhaust line and functional to remove and accumulate particulate matter from the exhaust, and a LNT configured within the exhaust line downstream from the DPF, the LNT begin functional to adsorb NOx from the exhaust and store the NOx under lean conditions. The DPF is operative as a fuel reformer and is functional when heated to generate reformate from a rich fuel-exhaust mixture. The system is adapted to heat the DPF above exhaust temperatures and to then provide the DPF with a rich fuel-exhaust mixture in order that the DPF produce reformate for reducing NOx stored in the LNT.

Another of the inventor's concepts relates to power generation system, comprising a diesel engine operative to produce power and exhaust containing particulate matter and NOx, an exhaust line configured to receive the exhaust from the engine, a DPF configured with the exhaust line and functional to remove and accumulate particulate matter from the exhaust, and a LNT configured within the exhaust line downstream from the DPF and functional to adsorb NOx from the exhaust and store the NOx under lean exhaust conditions. The DPF is operative as a fuel reformer functional to generate reformate for regenerating the LNT when provided with a rich fuel-exhaust mixture. The DPF comprises a soot gasification catalyst, whereby the DPF is operative to gasify accumulated particulate matter while producing reformate.

The primary purpose of this summary has been to present certain of the inventor's concepts in a simplified form to facilitate understanding of the more detailed description that follows. This summary is not a comprehensive description of every one of the inventor's concepts or every combination of the inventor's concepts that can be considered "invention". Other concepts of the inventor's will be conveyed to one of ordinary skill in the art by the following detailed description together with the drawings. The specifics disclosed herein may be generalized, narrowed, and combined in various ways with the ultimate statement of what the inventor claims as his invention being reserved for the claims that follow.

DETAILED DESCRIPTION

Figure 1:
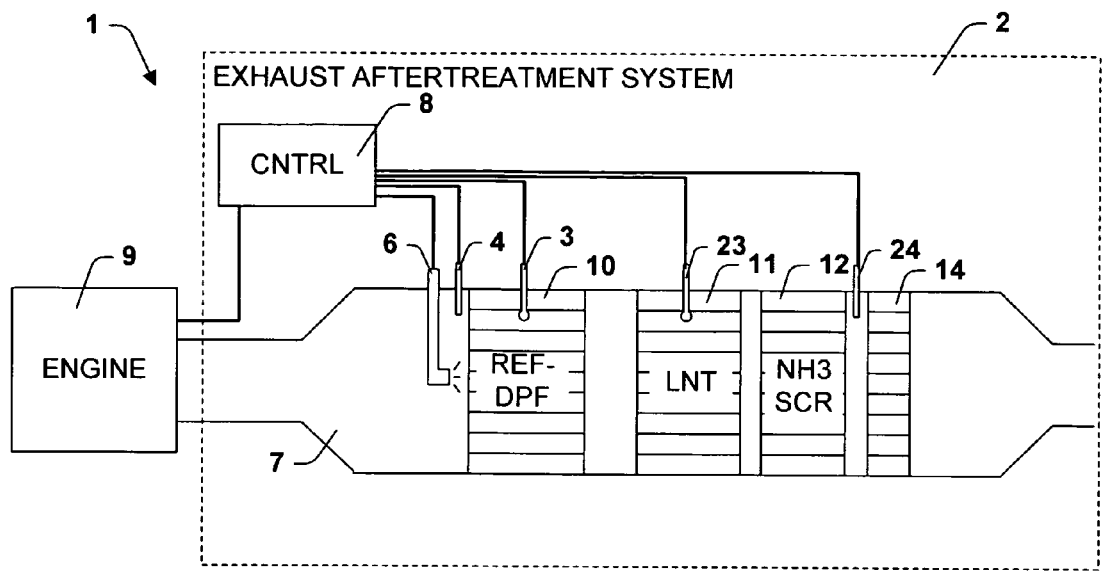
FIG. 1 is a schematic illustration of an exemplary power generation system conceived by the inventor.

FIG. 1 provides a schematic illustration of an exemplary power generation system 1 in which some of the inventor's concepts may be embodied. The system 1 includes a diesel engine 9 and an exhaust aftertreatment system 2. The exhaust aftertreatment system 2 includes a controller 8, an exhaust line 7 and a fuel injector 6 configured to inject fuel into the exhaust line 7. The exhaust line 7 contains diesel particulate filter (DPF) 10, a lean NOx-trap (LNT) 11, an ammonia-SCR catalyst 12, and a clean-up catalyst 14. The DPF 10 is also a fuel reformer (a combined DPF-fuel reformer). The controller 8 receives data from several sources; including temperature sensors 3 and 23 and NOx sensors 4 and 24. The controller 8 may be an engine control unit (ECU) that also controls the exhaust aftertreatment system 2 or may include several control units that collectively perform these functions.

The engine 9 is typically a diesel engine operational to produce a lean exhaust. Lean exhaust generally contains from about 4 to about 20% oxygen. Lean exhaust also generally contains NOx and soot. The engine 9 can be operated to reduce the production of either NOx or soot, but reducing the output of one pollutant typically increases the output of the other. Typical untreated diesel engine exhaust contains environmentally unacceptable amounts of both NOx and soot.

During lean operation (a lean phase), the combined DPF-fuel reformer 10 removes particulates from the exhaust while the LNT 11 adsorbs and stores NOx. The ammonia-SCR catalyst 12 may have ammonia stored from a previous regeneration of the LNT 11 (a rich phase). If the ammonia-SCR catalyst 12 contains stored ammonia, it removes a second portion of the NOx from the lean exhaust. The clean-up catalyst 14 may serve to oxidize CO and unburned hydrocarbons remaining in the exhaust.

From time-to-time, the LNT 11 must be regenerated to remove accumulated NOx (denitrated). Denitration involves, if required, heating the DPF-fuel reformer 10 to an operational temperature. Once the DPF-fuel reformer 10 is sufficiently heated, fuel is injected injecting using the fuel injector 6 at a rate that leaves the exhaust rich. The combined DPF-fuel reformer 10 uses the injected fuel to consume most of the oxygen from the exhaust while producing reformate. If the combined DPF-fuel reformer 10 includes a soot gasification catalyst, some of this reformate may be used removing accumulated soot from the DPF-fuel reformer 10. The bulk of the reformate passes to the LNT 11, where it reduces NOx stored in the LNT 11. Some NOx is reduced to $NH_3$, most of which is captured by the ammonia-SCR catalyst 15 and used to reduce NOx during a subsequent lean phase. The clean-up catalyst 14 oxidizes unused reductants and unadsorbed $NH_3$ using stored oxygen or residual oxygen remaining in the exhaust during the rich phases.

From time-to-time, the LNT 11 must also be regenerated to remove accumulated sulfur compounds (desulfated). Desulfation involves heating the combined DPF-fuel reformer 10 by injecting fuel at a rate that leaves the exhaust lean. The DPF-fuel reformer 10 is maintained at an elevated temperature until the LNT 11 is heated to a desulfating temperature. At that point, the DPF-fuel reformer 10 is provided with a reducing atmosphere. Desulfating temperatures vary, but are typically in the range from about 500 to about 850° C., with optimal temperatures typically in the range from about 650 to about 800° C. Below a minimum temperature, desulfation is very slow. Above a maximum temperature, the LNT 11 may be damaged.

Heat convection from the combined DPF-fuel reformer 10 can only heat the LNT 11 to the temperature of the combined DPF-fuel reformer 10. If desired, the LNT 11 can be heated to above the temperature of the DPF-fuel reformer 10 by pulsing the fuel injection so that the exhaust is alternately lean and rich. Reductant adsorbed by the LNT 11 during the rich phases can react with oxygen provided by the lean phases to produce heat within the LNT 11. Alternatively, oxygen adsorbed by the LNT 11 during the lean phases can react with reductant provided during the rich phases. The LNT 11 can also be heated above the temperature of the combined DPF-fuel reformer 10 by injecting fuel into an exhaust line between the combined DPF-fuel reformer 10 and the LNT 11 while the exhaust is lean. Electrical heating is another option.

According to one of the inventor's concepts, each time the LNT 11 is regenerated to remove accumulated NOx, the combined DPF-fuel reformer 10 is regenerated to remove accumulated soot. Regeneration does not require that all the soot be removed, but does require that a substantial amount be removed. The removal mechanism can be combustion, soot gasification, or a combination of the two.

In one embodiment, the combined DPF-fuel reformer 10 is a relatively low thermal mass device designed to be heated significantly above exhaust gas temperatures before producing reformate. Thus, a typical response to a control signal produced by the controller 8 to regenerate the LNT 11 is to heat the combined DPF-fuel reformer 10 under lean exhaust conditions. This is generally accomplished by injecting reductant into the exhaust upstream of the combined DPF-fuel reformer 10 at a rate that leaves the exhaust lean. The reductant can be injected into the exhaust prior to the exhaust leaving the engine as in a late fuel injection, into an exhaust manifold between the engine 9 and the exhaust line 7, or into the exhaust line 7, using the fuel injector 6 for example. The reductant is typically diesel fuel although other reductants could be used.

As the combined DPF-fuel reformer 10 heats prior to a rich LNT regeneration phase, the combined DPF-fuel reformer 10 may reach a temperature at which soot combustion rates become significant. Preferably, the rates reach a level at which exothermic soot combustion significantly assists the warm-up of the combined DPF-fuel reformer 10. A significant amount of soot combustion and soot removal can occur as the combined DPF-fuel reformer 10 heats prior to a rich LNT regeneration phase.

After the combined DPF-fuel reformer 10 has heated sufficiently, the reductant injection rate is set at a level that leaves the exhaust rich, initiating the rich LNT regeneration phase. Other measures may be taken to assist in making the exhaust rich. Such other measure may include throttling an air intake for the engine 9, increasing EGR rates, or changing transmission gear ratios to meet current power demands with a different engine speed, the different engine speed being selected to provide a reduced oxygen-fuel ratio in the exhaust. Under rich conditions, there is little or no soot combustion in the combined DPF-fuel reformer 10. Rich conditions are maintained through a rich phase, during which the LNT 11 regenerates.

After the rich phase, the exhaust is allowed to become lean once again. Fuel injection is generally discontinued altogether. At the beginning of the lean phase, the combined DPF-fuel reformer 10 is typically as warm as or warmer than at the beginning of the rich phase. If a significant amount of soot remains in the combined DPF-fuel reformer 10, soot combustion may take place at this stage, whereby a substantial amount of soot may be removed from the combined DPF-fuel reformer 10.

In another embodiment, a substantial amount of soot is removed from the combined DPF-fuel reformer 10 by soot gasification reactions taking place during the rich phases. Soot gasification reactions include:

$$C + 2H_2 \rightarrow CH_4 \quad (4)$$

$$C + H_2O \rightarrow CO + H_2 \quad (5)$$

$$C + CO_2 \rightarrow 2CO \quad (6)$$

Reaction (4) is hydrogen-methanation and is slightly exothermic. Reaction (5) is steam gasification and is endothermic. Reaction (6) is the reverse-Boudouard reaction, and is also endothermic. Reactions (5) and (6) can occur during both lean (with limited oxygen) and rich phases. If rich phases with substantial amounts of hydrogen are provided periodically, however, Reaction (4) will typically account for the bulk of the soot gasification. Hydrogen is very reactive and has an exceptionally high diffusivity.

A principal advantage of removing soot by soot gasification is that high temperatures associated with periodic soot combustion are avoided. Soot combustion typically involves a combustion front with local hot spots. High temperatures occurring at these hot spots can damage the DPF. If high temperatures can be avoided throughout the DPF operating cycle, a less expensive substrate, such as a cordierite substrate, can be used instead of a SiC substrate, which is typically used for its ability to endure high temperatures. Soot gasification avoids high temperatures by removing soot via reactions that are not highly exothermic.

When soot gasification takes place during denitrations, soot removal is more frequent than in conventional systems, which reduces the amount of aging the soot undergoes before being treated. Soot becomes harder to remove after aging. Frequently regenerating the combined DPF-fuel reformer 10 makes regenerations more efficient. Preferably, the mass-averaged soot particle lifetime in the combined DPF-fuel reformer 10 is about 15 minutes or less, more preferably about 10 minutes or less, still more preferably about 5 minutes or less. These averages are measured excluding any deposits, such as ash, that may be considered permanent in that they are not removable by routine DPF regenerations, such as soot gasification and soot combustion.

Any suitable catalyst can be used to catalyze the soot gasification reactions. Examples of suitable catalysts include precious metals. Alkali metals are also known to be soot gasification catalysts; however, they are generally ineffective except at higher temperatures. A preferred catalyst, such as a precious metal, is operable at typical diesel engine exhaust temperatures, e.g., about 400° C. Stability is also an important feature provided by precious metal catalysts to a greater degree than alkali metal catalysts.

Catalysts such as $CeO_2$ that have substantial oxygen storage capacity are preferably avoided. Stored oxygen can result in combustion of reductant at the beginning of each rich phase; undesirably increasing the fuel penalty for LNT regeneration and producing unwanted heat in the combined DPF-fuel reformer 10. Preferably, at least about 90% of the fuel provided to the DPF 10 over the course of each rich LNT regeneration phase is used to either remove excess oxygen from the exhaust or produce reformate, more preferably at least about 95%.

For soot gasification, the combined DPF-fuel reformer 10 is preferably of a type that provides a high degree of intimate contact between trapped soot and the catalyst coating. Generally, this means the combined DPF-fuel reformer 10 uses primarily depth filtration rather than cake filtration. Cake filtration is the primary filter mechanism in a wall flow filter. In a wall flow filter, the soot-containing exhaust is forced to pass through a porous medium. Typical pore diameters are from about 0.1 to about 25 μm. Soot particles are most commonly from about 10 to about 500 nm in diameter. In a fresh wall flow filter, the initial removal is by depth filtration, with soot becoming trapped within the porous structure. Quickly, however, the soot forms a continuous layer on an outer surface of the porous structure. Subsequent filtration is through the filter cake and the filter cake itself determines the filtration efficiency. As a result, the filtration efficiency increases over time. The filter cake is generally allowed to build to a thickness from about 15 to 50 μm deep before regeneration. Thus, although some depth filtration occurs in a wall flow filter, the primary mechanism is cake filtration and only a small fraction of the soot is in intimate contact with the DPF and any catalyst coating.

In a flow through filter on the other hand, the primary mechanism of soot trapping is depth filtration and there is a relatively intimate contact between the soot and the catalyst coating. In a flow through filter, the exhaust is channeled through macroscopic passages. The passages may have rough walls, baffles, or bends designed to increase the tendency of momentum to drive soot particles against or into the walls, but the flow is not forced through micro-pores. The resulting soot removal is considered depth filtration, although the soot is generally not distributed uniformly with the depth of any structure of the filter. Because the soot does not form such thick layers as in cake filtration, there is more intimate contacting between the soot and the soot gasification catalyst coating the combined DPF-fuel reformer 10. In depth filtration, soot layers are less than 10 μm deep, typically less than 1 μm deep.

Flow through filters are also more conducive to providing a combined DPF-fuel reformer 10 that has a low thermal mass. Low thermal mass is achieved with small size and thin walls. A preferred wall substrate is metal or metal alloy, which can be formed into thin sheets. Flow through metal-walled DPFs are available commercially, through Emitec™, for example. A low thermal mass is conducive to heating the combined DPF-fuel reformer 10. Although not required, in a preferred embodiment the combined DPF-fuel reformer 10 is heated to above exhaust gas temperatures in order to produce reformate. The type of reformer that operates at higher temperatures requires less catalyst. Elevated temperatures are also desirable to enhance to soot combustion mechanism of regenerating the combined DPF-fuel reformer 10.

Soot gasification and or soot combustion can be used in conjunction with continuous combustion of soot. Continuous combustion generally requires $NO_2$ in the exhaust and a suitable catalyst in the combined DPF-fuel reformer 10. $NO_2$ is normally present in the exhaust, but when continuous combustion is desired, the $NO_2$ concentration is generally increased by providing a catalyst for oxidizing a portion of the NO in the exhaust to $NO_2$.

Figure 2:
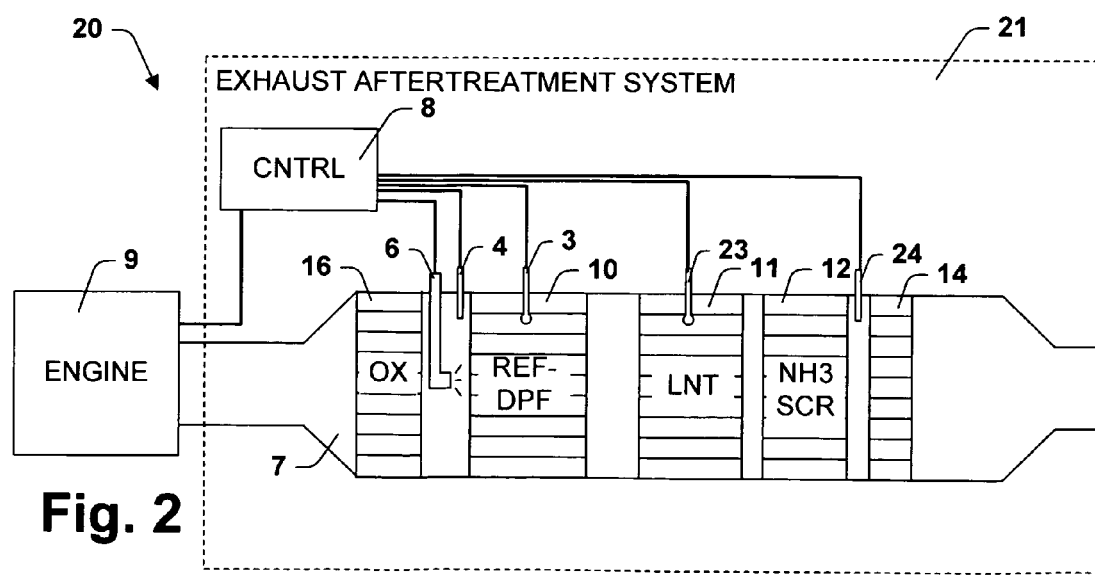
FIG. 2 is a schematic illustration of another exemplary power generation system conceived by the inventor.

Continuous combustion generally requires a large amount of oxidation catalyst for converting NO to $NO_2$, but if continuous combustion is not the only mechanism relied on a smaller oxidation catalyst can be used. Preferably, this oxidation catalyst is located near the engine and can serve other purposes. FIG. 2 illustrates an exemplary power generation system 20 in which the exhaust treatment system 21 comprises an oxidation catalyst close to the engine 9. Other components of the power generation system 20 are similar to those of the power generation system 1.

Besides converting NO to $NO_2$ under lean exhaust conditions, the oxidation catalyst 16 can operate to heat the exhaust slightly by combusting residual hydrocarbons in the exhaust. This additional heat can extend the operating temperature range of the LNT 11 and the combined DPF-fuel reformer 10, allowing the combined DPF-fuel reformer 10 to be heated using injected fuel when exhaust temperatures are lower and allowing the LNT 11 to be effective at lower (engine out) exhaust temperatures.

Another potential use for the oxidation catalyst 16 is to remove a portion of the oxygen from the exhaust, which facilitates stable operation of combined DPF-fuel reformer 10. When exhaust oxygen concentrations are high, the combined DPF-fuel reformer 10 may tend to overheat during regeneration of the LNT 11. To prevent overheating, it may be necessary to periodically discontinue fuel injection and allow the combined DPF-fuel reformer 10 to cool down. These interruptions increase the fuel penalty for regenerating the LNT 11. Consuming some of the oxygen upstream of the combined DPF-fuel reformer 10 reduces the likelihood that such shutdowns will be required and facilitates an uninterrupted rich phase. Heat produced by consuming oxygen upstream of the combined DPF-fuel reformer 10 may eventually transfer to the combined DPF-fuel reformer 10, but the transfer is delayed due to the thermal mass of the upstream devices, some of the heat is lost to the surroundings, and the heat that does arrive is distributed more uniformly and is thus less problematic. To increase the amount of oxygen removal by the oxidation catalyst 16 during operation of the combined DPF-fuel reformer 10 as a reformer, the engine 9 can be operated to produce a greater than normal amount of hydrocarbon, possibly even exceeding its smoke limit.

The time at which to regenerate the LNT 11 to remove accumulated NOx can be determined by any suitable method. Examples of methods of determining when to begin a regeneration include initiating a regeneration upon reaching a thresholds in any of a NOx concentration in the exhaust, a total amount of NOx emissions per mile or brake horsepower-hour over a previous period or since the last regeneration, a total amount of engine out NOx since the last regeneration, an estimate of NOx loading in the LNT 11, and an estimate of adsorption capacity left in the LNT 11. Regeneration can be periodic or determined by feed forward or feedback control. Regeneration can also be opportunistic, being triggered by engine operating conditions that favor low fuel penalty regeneration. A threshold for regeneration can be varied to give a trade off between urgency of the need to regenerate and favorability of the current conditions for regeneration. The time at which to regenerate the LNT 11 can be determined by the controller 8, which generates a control signal that initiates the regeneration process.

Desulfation may be scheduled periodically, e.g., after every 30 hours of operation. Alternatively, desulfation may be scheduled based on an estimate of the amount on SOx stored in the LNT 11. The amount of stored SOx can be assumed to increase in proportion to fuel usage and to decrease in a manner dependent on the extent of desulfations. A further option is to determine the need for desulfation based on system performance, e.g., based on the activity of the LNT 11 following an extensive denitration or based on the frequency with which denitration is required.

The combined DPF-fuel reformer 10 converts injected fuel into more reactive reformate. A reformer that operates at diesel exhaust gas temperatures requires a large amount of catalyst and may excessively increase the cost of an exhaust aftertreatment system. Accordingly, the combined DPF-fuel reformer 10 is preferably of the type that has low thermal mass and must be heated above exhaust gas temperatures to be operational.

While the LNT 11 is regenerated effectively by both CO and $H_2$, $H_2$ is much preferred for soot gasification. Thus, although not required or most reformers used to regenerate LNTs, in one embodiment, the combined DPF-fuel reformer 10 is augmented with a water-gas shift reaction catalyst for converting CO to $H_2$. The catalyst can be combined with the other catalysts forming a washcoat on the combined DPF-fuel reformer 10.

Figure 3:
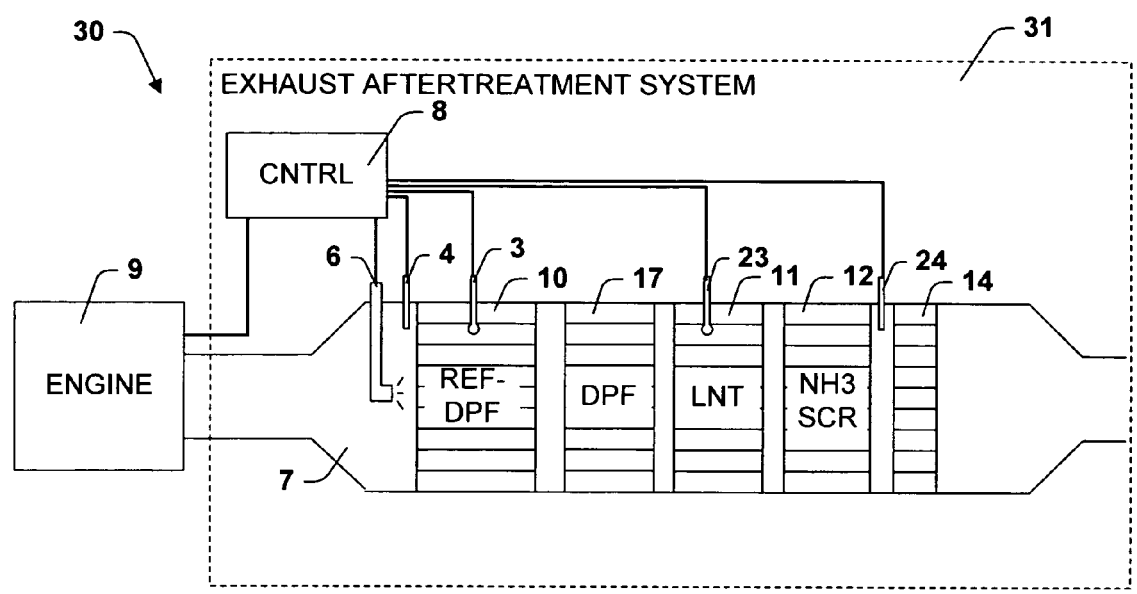
FIG. 3 is a schematic illustration of still another power generation system conceived by the inventor.

If it is difficult to achieve a target level of particulate emission control while maintaining a sufficiently small size of the combined DPF-fuel reformer 10, one option is to install a second DPF downstream of the combined DPF-fuel reformer 10. FIG. 3 is a schematic illustration of an exemplary power generation system 30 having an exhaust treatment system 31 in which a second DPF 17 is configured downstream of the combined DPF-fuel reformer 10. The second DPF 17 can be of the wall flow type and much large than the combined DPF-fuel reformer 10. Preferably, however, the majority of the particulates are removed by the combined DPF-fuel reformer 10. The second DPF 17 can be heated for regeneration in conjunction with heating of the LNT 11 for desulfation. The second DPF 17 can be either upstream of the LNT 11 as illustrated or downstream of the LNT 11. In the upstream position, the second DPF 17 can protect the LNT 11 from frequent temperature excursions that may shorten the lifetime of the LNT 11.

While the engine 9 is preferably a compression ignition diesel engine, the various concepts of the inventor are applicable to power generation systems with lean-burn gasoline engines or any other type of engine that produces an oxygen rich, NOx-containing exhaust. For purposes of the present disclosure, NOx consists of NO and $NO_2$.

The power generation system can have any suitable types of transmission. A transmission can be a conventional transmission such as a counter-shaft type mechanical transmission, but is preferably a CVT. A CVT can provide a much larger selection of operating points than a conventional transmission and generally also provides a broader range of torque multipliers. The range of available operating points can be used to control the exhaust conditions, such as the oxygen flow rate and the exhaust hydrocarbon content. A given power demand can be met by a range of torque multiplier-engine speed combinations. A point in this range that gives acceptable engine performance while best meeting a control objective, such as minimum oxygen flow rate, can be selected.

In general, a CVT will also avoid or minimize interruptions in power transmission during shifting. Examples of CVT systems include hydrostatic transmissions; rolling contact traction drives; overrunning clutch designs; electrics; multi-speed gear boxes with slipping clutches; and V-belt traction drives. A CVT may involve power splitting and may also include a multi-step transmission.

A preferred CVT provides a wide range of torque multiplication ratios, reduces the need for shifting in comparison to a conventional transmission, and subjects the CVT to only a fraction of the peak torque levels produced by the engine.

This can be achieved using a step-down gear set to reduce the torque passing through the CVT. Torque from the CVT passes through a step-up gear set that restores the torque. The CVT is further protected by splitting the torque from the engine, and recombining the torque in a planetary gear set. The planetary gear set mixes or combines a direct torque element transmitted from the engine through a stepped automatic transmission with a torque element from a CVT, such as a band-type CVT. The combination provides an overall CVT in which only a portion of the torque passes through the band-type CVT.

A fuel reformer is a device that converts heavier fuels into lighter compounds without fully combusting the fuel. A fuel reformer can be a catalytic reformer or a plasma reformer. Preferably, the combined DPF-fuel reformer 10 is a partial oxidation catalytic reformer comprising a steam reforming catalyst. Examples of reformer catalysts include precious metals, such as Pt, Pd, Rh, or Ru, and oxides of Al, Mg, and Ni, the later group being typically combined with one or more of CaO, $K_2O$, and a rare earth metal such as Ce to increase activity. A reformer is preferably small in size as compared to an oxidation catalyst or a three-way catalyst designed to perform its primary functions at temperatures below 450° C. The combined DPF-fuel reformer 10 is generally operative at temperatures from about 450 to about 1100° C.

The LNT 11 can comprise any suitable NOx-adsorbing material. Examples of NOx adsorbing materials include oxides, carbonates, and hydroxides of alkaline earth metals such as Mg, Ca, Sr, and Ba or alkali metals such as K or Cs. Further examples of NOx-adsorbing materials include molecular sieves, such as zeolites, alumina, silica, and activated carbon. Still further examples include metal phosphates, such as phosphates of titanium and zirconium. Generally, the NOx-adsorbing material is an alkaline earth oxide. The adsorbent is typically combined with a binder and applied as a coating over an inert substrate.

The LNT 11 also comprises a catalyst for the reduction of NOx in a reducing environment. The catalyst can be, for example, one or more transition metals, such as Au, Ag, and Cu, group VIII metals, such as Pt, Rh, Pd, Ru, Ni, and Co, Cr, or Mo. A typical catalyst includes Pt and Rh. Precious metal catalysts also facilitate the adsorbent function of alkaline earth oxide absorbers.

Adsorbents and catalysts according to the present invention are generally adapted for use in vehicle exhaust systems. Vehicle exhaust systems create restriction on weight, dimensions, and durability. For example, a NOx adsorbent bed for a vehicle exhaust systems must be reasonably resistant to degradation under the vibrations encountered during vehicle operation.

The ammonia-SCR catalyst 12 is a catalyst effective to catalyze reactions between NOx and $NH_3$ to reduce NOx to $N_2$ in lean exhaust. Examples of SCR catalysts include oxides of metals such as Cu, Fe, Zn, V, Cr, Al, Ti, Mn, Co, Fe, Ni, Pd, Pt, Rh, Rd, Mo, W, and Ce, zeolites, such as ZSM-5, ZSM-11, MOR, or FER substituted with metal ions such as cations of Cu, Fe, Co, Ag, Zn, or Pt, and activated carbon. Preferably, the ammonia-SCR catalyst 12 is designed to tolerate temperatures required to desulfate the LNT 11.

The combined DPF-fuel reformer 10 can have any suitable structure. Examples of suitable structures include monolithic wall flow filters, which are typically made from ceramics, especially cordierite or SiC, blocks of ceramic foams, monolith-like structures of porous sintered metals or metal-foams, and wound, knit, or braided structures of temperature resistant fibers, such as ceramic or metallic fibers.

The clean-up catalyst 14 is preferably functional to oxidize unburned hydrocarbons from the engine 9, unused reductants, and any $H_2S$ released from the NOx absorber-catalyst 11 and not oxidized by the ammonia-SCR catalyst 12. Any suitable oxidation catalyst can be used. To allow the clean-up catalyst to function under rich conditions, the catalyst may include an oxygen-storing component, such as ceria. Removal of $H_2S$, where required, may be facilitated by one or more additional components such as NiO, $Fe_2O_3$, $MnO_2$, CoO, and $CrO_2$.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A method of operating a power generation system, comprising:

operating a diesel engine to produce power and exhaust containing particulate matter and NOx;

passing the exhaust through a combined DPF-fuel reformer, thereby removing a majority of the particulate matter from the exhaust, the particulate matter accumulating in the DPF-fuel reformer;

passing the exhaust through a LNT that adsorbs and stores NOx from the exhaust;

from time-to-time, issuing a control signal to regenerate the LNT to remove stored NOx;

in response to the control signal, injecting fuel into the exhaust upstream of the combined DPF-reformer at a rate that leaves the exhaust lean, whereby the injected fuel combusts in the combined DPF-reformer, warming the combined DPF-reformer; and in a rich phase following warming the combined DPF-reformer, injecting fuel into the exhaust at a rate that leaves the exhaust rich, whereby the DPF-reformer produces reformate and the LNT is regenerated;

wherein with every LNT regeneration the combined DPF-reformer undergoes a regeneration that removes accumulated particulate matter.

2. The method of claim 1, wherein the combined DPF-reformer has a coating comprising a soot gasification catalyst, whereby a substantial amount of particulate matter is removed by soot gasification during the rich phase.

3. The method of claim 1, wherein the combined DPF-reformer removes soot from the exhaust primarily by depth filtration.

4. The method of claim 1, wherein during the process of warming the combined DPF-reformer, the combined DPF-reformer reaches a temperature at which accumulated particulate matter combusts with oxygen in the exhaust and a significant amount of particulate matter combusts with oxygen prior to the rich phase.

5. The method of claim 4, wherein particulate matter combustion substantially contributes to the heating of the combined DPF-reformer.

6. The method of claim 1, wherein during the rich phase the combined DPF-reformer reaches a temperature at which accumulated particulate matter combusts with oxygen in the exhaust and a significant amount of particulate matter accumulated by the DPF-reformer combusts with oxygen in a lean phase immediately following the rich phase.

7. The method of claim 1, further comprising passing the exhaust through a second DPF to remove additional particulate matter from the exhaust downstream of the combined DPF-fuel reformer.

8. A power generation system configured to operate according to the method of claim 1.

9. A vehicle comprising the power generation system of claim 8.

10. A power generation system, comprising:
a diesel engine operative to produce power and exhaust containing particulate matter and NOx;
an exhaust line configured to receive the exhaust from the engine;
a DPF configured with the exhaust line and functional to remove and accumulate particulate matter from the exhaust; and
a LNT configured within the exhaust line downstream from the DPF, the LNT begin functional to adsorb NOx from the exhaust and store the NOx under lean conditions;
wherein the DPF is operative as a fuel reformer when heated and is functional when heated to generate reformate from a rich fuel-exhaust mixture; and the system is adapted to heat the DPF above exhaust temperatures and to then provide the DPF with a rich fuel-exhaust mixture in order that the DPF produce reformate for reducing NOx stored in the LNT, the adaptations including a low thermal mass for the DPF that facilitates heating for each LNT regeneration.

11. The power generation system of claim 10, wherein the DPF has a metal substrate.

12. The power generation system of claim 10, wherein the DPF is operative to remove soot primarily by depth filtration.

13. The power generation system of claim 10, further comprising a second DPF in the exhaust line downstream of the DPF that is operative as a fuel reformer.

14. The power generation of claim 13, wherein one DPF is adapted to remove particulate matter from the exhaust primarily by depth filtration while the other DPF is adapted to remove particulate matter from the exhaust primarily be cake filtration.

15. The power generation system of claim 10, wherein the DPF comprises a soot gasification catalyst.

16. A power generation system, comprising:
a diesel engine operative to produce power and exhaust containing particulate matter and NOx;
an exhaust line configured to receive the exhaust from the engine;
a DPF configured with the exhaust line and functional to remove and accumulate particulate matter from the exhaust;
a LNT configured within the exhaust line downstream from the DPF, the LNT begin functional to adsorb NOx from the exhaust and store the NOx under lean conditions;
wherein the DPF is operative as a fuel reformer functional to generate reformate for regenerating the LNT when provided with a rich fuel-exhaust mixture; and
the DPF comprises a soot gasification catalyst, whereby the DPF is operative to gasify accumulated particulate matter while producing reformate.

17. The power generation system of claim 16, wherein the DPF has a metal substrate.

18. The power generation system of claim 16, wherein the DPF is operative to remove soot primarily by depth filtration.

19. The power generation system of claim 16, further comprising a second DPF in the exhaust line downstream of the DPF that is operative as a fuel reformer.

20. The power generation of claim 19, wherein one DPF is adapted to remove particulate matter from the exhaust primarily by depth filtration while the other DPF is adapted to remove particulate matter from the exhaust primarily be cake filtration.

\* \* \* \* \*